Patented June 30, 1942

2,288,197

UNITED STATES PATENT OFFICE 2,288,197

ACRYLIC ACID AMIDES

Georg Kränzlein and Martin Corell, Frankfort-on-the-Main, Germany

No Drawing. Application July 24, 1940, Serial No. 347,306. In Germany August 31, 1939

2 Claims. (Cl. 260—562)

The present invention relates to acrylic acid amides.

We have found that chloropropionic acid amides split off hydrochloric acid in a simple reaction by treating them with alkalies or with agents having an alkaline action. The industrially important acrylic acid amides may thus be prepared. This is a surprising fact since, as is known, the aliphatic acid amides, for instance acetanilide, propionic acid anilide or other amides of the aliphatic acids having a similar constitution are very readily saponified by alkalies, so that there had to be feared that the new reaction would not set in or would occur only to a subordinate extent. As parent materials for the manufacture of acrylic acid amides there are used the beta-chloropropionic acid amides of the following composition:

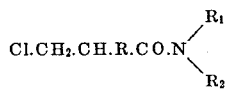

wherein $R_1$ and $R_2$ may stand for an alkyl, aralkyl, aryl, hetero-aryl or cycloaliphatic radical and $R_1$ may also stand for a hydrogen atom, furthermore R stands for a hydrogen atom or an alkyl radical and

together stand for a heterocyclic radical.

By the afore-named process the following compounds may be prepared:

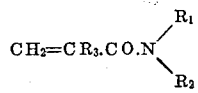

wherein $R_1$ stands for a substituent of the group consisting of hydrogen, alkyl, aralkyl, aryl, hetero-aryl and cycloalkyl, $R_2$ stands for a substance of the group consisting of alkyl, aralkyl, aryl, hetero-aryl, cycloalkyl and the radical —$(CH_2)_n$—NH—CO—$CR_3$=$CH_2$ (n being at least 2) and $R_3$ stands for a substance of the group consisting of hydrogen and alkyl. These products are also accessible by another method, for instance by the reaction of acrylic acid chloride with the corresponding amides.

The following compounds may for instance be prepared:

Acrylic acid—anilide
Acrylic acid—ethylamide
Acrylic acid—butylamide
Acrylic acid—octodecylamide
Acrylic acid—diethylamide
Acrylic acid—dibutylamide
Acrylic acid—benzylamide
Acrylic acid—methylanilide
Acrylic acid—cyclohexylamide
Acrylic acid—dicyclohexylamide
Acrylic acid—piperidide
Acrylic acid—pyrolidide
Acrylic acid—carbazolidide
Acrylic acid—tetrahydrocarbazolidide
Diacrylic acid—hexamethylene-diamide
$$CH_2=CH.CO.NH—(CH_2)_6—NH.CO.CH=CH_2$$
Diacrylic acid—ethylene-diamide
$$CH_2=CH.CO.NH—CH_2—CH_2—NH.CO.CH=CH_2$$

The following examples serve to illustrate the invention, but they are not intended to limit it thereto, the parts being by weight:

(1) 20 parts of beta-chloropropionyl-n-butyl-amide obtained from beta-chloropropionyl chloride and n-butylamine in benzene and boiling at 140° C.–142° C. under a pressure of 25 mm. with a slight decomposition, are heated for a short time to boiling, while stirring, together with 400 parts of caustic potash solution of 20 per cent strength. The oil separating after cooling is removed from the alkaline liquid, washed with water until neutral, dried and distilled under reduced pressure. The acrylic acid-n-butyl amide distills under a pressure of 32 mm. and at a temperature of 190° C.–194° C.

(2) 10 parts of beta-chloropropionyl-benzyl-amide melting at 96° C. and 200 parts of caustic potash solution of 20 per cent strength are heated for some minutes to 100° C. After cooling the product is filtered with suction, washed until neutral and dried under reduced pressure. After having been recrystallized from water the acrylic acid benzyl amide shows a melting point of 69° C.

(3) 35.5 parts of beta-chloropropionyl-anilide melting at 119° C. and prepared from aniline and chloropropionyl-chloride in benzene are heated for a short time to 100° C., while stirring, together with 712 parts of aqueous caustic potash solution of 20 per cent strength. After the stirring operation has ceased an oil separates on the surface of the liquid which solidifies on cooling. The product of the reaction is filtered with suction, washed until neutral and recrystallized from water. It then has a melting point of 106° C. and is identical with the known acrylic acid anilide.

(4) 10 parts of beta-chloropropionyl-N-methyl-anilide boiling at 168° C.–170° C. under a pressure of 18 mm. and 200 parts of caustic potash solution of 20 per cent strength are heated for a short time to 100° C. After the oil has separated it is distilled at 140° C.–142° C. under a pressure of 20 mm. It solidifies in the receiver and melts at 76 C.–78° C.

(5) 50 parts of beta-chloropropionyl-cyclohexyl-amide melting at 110° C. are heated to boiling, while stirring, in 1000 parts of caustic potash solution of 20 per cent strength. The product is cooled, filtered with suction, washed until neutral, dried and then recrystallized from water. It crystallizes in colorless needles melting at 116° C.

(6) 20 parts of beta-chloropropionyl-octodecyl-amide melting at 88° C. and obtained from octodecyl-amide and beta-chloropropionyl chloride in benzene are heated to boiling for 1 hour in a reflux condenser together with 100 parts of anhydrous pyridine. After cooling the acrylic acid octodecylamide separates which recrystallized from methanol melts at 68° C.

(7) 195 parts of beta-chloropopionyl-n-butylamide are heated to boiling for 2 hours in a reflux condenser in 975 parts of pyridine. The pyridine is then distilled by means of steam from the clear solution and after the aqueous solution has been allowed to cool it is rendered alkaline by means of dilute caustic soda solution. The oil which has separated is then removed, washed until neutral and distilled under reduced pressure. The acrylic acid-n-butylamide formed distils at 121° C.–123° C. under a pressure of 4 mm.

(8) 115 parts of beta-chloropropionyl-n-butyl-amide and 2300 parts of sodium carbonate solution of 20 per cent strength are heated to boiling for 2 hours, while stirring. The hydrochloric acid is separated in said case in the heterogeneous phase. The oil is allowed to cool and to deposit; it is then separated and distilled under reduced pressure. It distils at 114° C.–116° C. under a pressure of 2 mm. and constitutes pure acrylic acid-n-butylamide.

(9) 100 parts of beta-chloropropionic acid diphenylamide melting at 102° C. and obtained from beta-chloropropionic acid chloride and diphenyl-amine are dissolved in 500 parts of pyridine and the solution obtained is heated to boiling for about 1 hour. After cooling the pyridinium chloride separates; it is filtered with suction, dissolved in water and the acrylic acid-diphenylamide is precipitated from this solution by means of caustic soda solution. After having been washed and dried the acrylic acid, diphenyl-amide melts at 89° C. It is readily soluble in organic solvents and may be recrystallized from methanol.

(10) 50 parts of beta-chloropropionyl-2-methylbenzthiazolamide-6 of the following composition

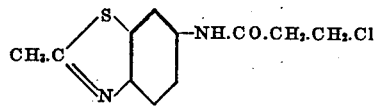

are suspended in 250 parts of pyridine. The suspension is heated to boiling; during this operation dissolution occurs. After heating has been continued for 1 hour the solution is cooled to room temperature and the pyridinium chloride which has separated is filtered with suction. The residue is dissolved in 1000 parts of water and such a quantity of caustic soda solution is added until separation begins. The whole is allowed to stand for some time whereupon the product of the reaction separates in the solid form. It is filtered with suction, washed and dried. It melts at 170° C. and constitutes an acrylic acid amide of the following constitution:

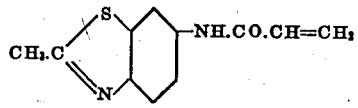

(11) 50 parts of beta-chloropropionylcarbazolide melting at 118° C. and obtained by boiling a solution of 1 mol of carbazol in chlorobenzene with 1 mol of beta-chloropropionic acid chloride are heated to boiling for 2 hours together with 400 cc. of pyridine. After cooling the pyridinium chloride separates and is dissolved in water, wherein it is split by caustic soda solution. The acrylic acid carbazolide first separates in the form of an oil. After some hours the oil solidifies; it may be filtered with suction and washed.

The acrylic acid amide obtained has the following constitution:

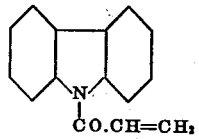

It melts at 46° C.–48° C.

(12) 50 parts of beta-chloropropionyl-alpha-aminoanthraquinone melting at 188° C. are suspended in 250 parts of pyridine. When the suspension is heated to boiling a nearly complete dissolution temporarily occurs which is followed very soon by a thick separation. The whole is boiled for about 1 hour and after cooling it is filtered with suction. The residue is boiled with water and after cooling there is precipitated from the clear filtrate by means of caustic soda solution the anthraquinone-alpha-acrylic acid amide which crystallizes from alcohol in the form of yellow needles and melts at 197° C.

Other amino-anthraquinones may be transformed in a similar manner into acrylic amides. Acrylic acid amides from beta-chloropropionyl compounds of alpha- or beta-naphthylamine and the derivatives thereof, of para- and ortho-amidodiphenyl, of amidopyrene, amidofluorene, amidochrysene or mixtures of amines may be obtained in a similar manner.

We claim:

1. The compounds of the following general formula:

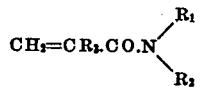

wherein $R_1$ and $R_2$ stand for aryl and $R_3$ stands for a substance of the group consisting of hydrogen and alkyl.

2. The compound of the following formula:

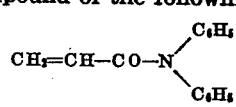

GEORG KRÄNZLEIN.
MARTIN CORELL.